United States Patent [19]
Taylor

[11] 3,940,974
[45] Mar. 2, 1976

[54] ELECTRICALLY COMPENSATED SENSOR
[75] Inventor: Allen L. Taylor, Woodbury, Minn.
[73] Assignee: Minnesota Mining and Manufacturing Company, St. Paul, Minn.
[22] Filed: May 6, 1974
[21] Appl. No.: 467,014

[52] U.S. Cl............ 73/88.5 R; 73/344; 73/362 CP;
      73/DIG. 4; 307/88 ET; 310/8.6
[51] Int. Cl.² ... G01B 7/16; G01K 7/00; H01G 7/02
[58] Field of Search..... 73/88.5 R, 88.5 SD, DIG. 4,
      73/344, 345, 355 R, 31, 362 R, 362 CP;
      307/88 ET; 317/247, 262 F; 310/8.6, 8.9

[56] References Cited
UNITED STATES PATENTS

| | | | |
|---|---|---|---|
| 2,540,194 | 2/1951 | Ellett | 317/262 F X |
| 2,769,867 | 11/1956 | Crownover et al. | 73/DIG. 4 UX |
| 3,233,466 | 2/1966 | Shaw | 73/DIG. 4 UX |
| 3,448,348 | 6/1969 | Stadler | 317/262 F X |
| 3,453,432 | 7/1969 | McHenry | 317/247 X |
| 3,480,777 | 11/1969 | Astheimer | 317/247 X |
| 3,877,308 | 4/1975 | Taylor | 73/362 CP |
| R27,354 | 5/1972 | Wiebe et al. | 73/344 X |

Primary Examiner—Richard C. Queisser
Assistant Examiner—Frederick Shoon
Attorney, Agent, or Firm—Alexander, Sell, Steldt & DeLahunt

[57] ABSTRACT

A sensing device that may be employed as a thermal or stress sensor includes in one embodiment a pair of poled electret layers as sensing mediums for detecting variations in the ambient temperature of the sensor. The electret layers of such embodiment have pyroelectric and piezoelectric properties, but only pyroelectrically produced electrical signals are used for sensing and piezoelectrically produced signals due to bending are effectively negated. In another embodiment, the electret layers are used as stress sensors whereby piezoelectrically produced electrical signals are sensed and pyroelectric signals are operatively canceled.

6 Claims, 7 Drawing Figures

ELECTRICALLY COMPENSATED SENSOR

BACKGROUND OF THE INVENTION

1. Field of the Invention

The present invention relates generally to the broad area of sensing devices and more specifically to a sensing device that includes a plurality of layers of electret material as sensing elements.

2. Description of the Prior Art

One common definition of an electret is a dielectric material permanently polarized by heating the material and placing it in a strong electric field during cooling. Electrets are commonly classified on the basis of pyroelectric or piezoelectric properties, both of which produce an electrical signal due to a change in dipoled moment. Although pyroelectric and piezoelectric materials are often thought of as two distinct classes of electrets, actually piezoelectric materials are a generic class in which pyroelectric materials are included as a species. Thus, a large number of materials have been pyroelectric and piezoelectric characteristics.

Use of electrets having both pyroelectric and piezoelectric properties has been made in forming various types of sensing devices as evidenced by U.S. Pat. No. 3,769,096 to Ashkin et al., which discloses a device for pyroelectric sensing of incident radiation, and U.S. Pat. No. 3,768,059 to Ayers et al., which teaches a strain sensor employing piezoelectric principles. The type of electrets described in the above patents have both pyroelectric and piezoelectric properties. Thus, the Ashkin et al. sensor is susceptible to producing an erroneous sensing operation as a result of spurious piezoelectrically produced electrical signals and similarly, the sensor in the Ayers et al patent has the same susceptibility because of pyroelectrically produced signals.

SUMMARY OF THE INVENTION

The present invention provides a precise and accurate sensing device that employs a pair of layers of electret material as sensing mediums. The electret layers are separated by an inner conductive layer that is in electrical contact with one surface of each of the electret layers. The other surface of each layer is coated by an outer conductive layer. An electronic sensing circuit is connected to at least two of the conductive layers for detecting electrical signals thereon.

In a first preferred embodiment, the present invention is utilized as a thermal sensor having an operation dependent upon the sensing of pyroelectrically produced electrical signals and canceling of spurious piezoelectrically produced signals due to bending. Accordingly, precise and accurate sensing is achieved. The two electret layers of this embodiment are poled in opposite directions, and the sensing circuitry is connected across the inner conductive plate and the outer conductive plates, which outer plates are electrically grounded together. By thus using two electret layers as sensing mediums the sensing signal is double that of a sensor using only one electret layer for a given change in temperature, and by grounding the outer conductive layers the sensor is shielded from sensing spurious electrostatic charges.

In another preferred embodiment, the present invention is utilized as a stress sensor to sense electrical signals that are piezoelectrically produced by bending, with provisions made to operatively cancel all spurious pyroelectrically produced signals. Therefore, this embodiment also provides accurate and precise sensing.

The foregoing and other advantages of the present invention will appear from the following description. In the description reference is made to the accompanying drawings, which form a part hereof, and in which there is shown by way of illustration, and not of limitation, specific forms in which the invention may be embodied. Such embodiments do not represent the full scope of the invention, but rather the invention may be employed in a variety of embodiments, and reference is made to the claims herein for interpreting the breadth of the invention.

DESCRIPTION OF THE PREFERRED EMBODIMENTS

The present invention relates to thermal sensing devices that employ sensing mediums formed of a polymer electret material that has both pyroelectric and piezoelectric properties. The former property produces an electrical signal due to changes in ambient temperature of the sensing medium whereas the latter property produces an electrical signal as a result of axial stress changes in the sensing medium. The present invention provides various forms of sensors which produce sensing operations through the detecting of electrical signals produced in a sensing medium because of one of the above properties, with provisions made for canceling electrical signals produced by the other property to provide accurate and precise sensing.

Figure 1:
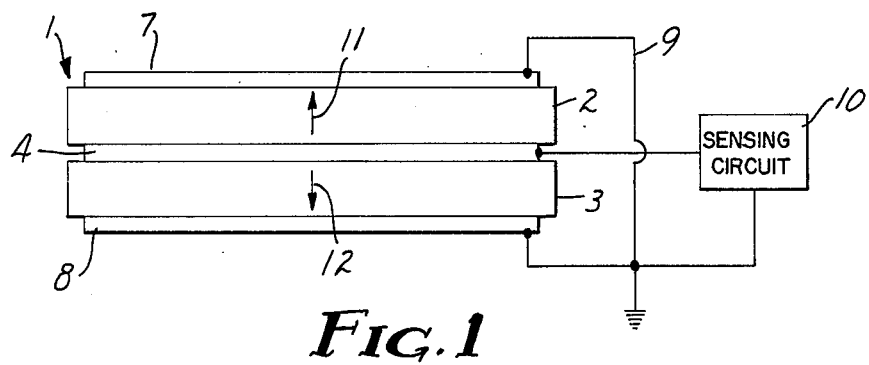
FIG. 1 is a schematic diagram of a first embodiment of the present invention that is utilized as a thermal sensing device.

Referring now to FIG. 1, a first preferred embodiment of the present invention is shown in the form of a thermal sensor 1 which provides for the sensing o pyroelectrically produced electrical signals, and i: compensated to substantially cancel piezoelectric charges caused by bending. The sensor 1 preferably includes two similar nonconductive electret layers 2 and 3 that may be formed from polyvinylidene fluoride polyvinyl fluoride, lanthanum modified lead zirconate titanate or some other such noncrystalline material having both pyroelectric and piezoelectric properties.

The electret layers 2 and 3 serve as sensing mediums in the sensor 1 and are joined together in electrical contact by a conductive layer 4 that is in surface-to-surface electrical contact with an inner surface of each of the layers 2 and 3. The outer surfaces of the layers 2 and 3 are also in surface-to-surface electrical contact with equally sized conductive layers 7 and 8, respectively, which may be coated on the outer surfaces of the electret layers 2 and 3. Layers 7 and 8 are electrically connected together to ground by a conductor 9. A sensing circuit 10, such as a voltmeter, ammeter or other suitable sensing circuitry, is electrically connected between the conductive layer 4 and ground. For purposes of clarity, the thickness of the layers 2, 3, 4, 7 and 8 are shown exaggerated. Sensors have been made with the layers 2 and 3 normally about 50 microns each and the layers 4, 7 and 8 normally about 20 microns each. However, the layers 2 and 3 may be as thin as 6 microns and the layers 4, 7 and 8 may be as thin as 1 micron.

The electret layers 2 and 3 are preferably uniformly poled with respect to magnitude, but are poled in opposite directions, as indicated by the arrows 11 and 12 in the layers 2 and 3 respectively. Poling of the electret layers 2 and 3 arranges the dipoles of the layers 2 and 3 normal to the planar surfaces thereof when the layers are heated above a particular temperature commonly referred to as the poling temperature. At the poling temperature, the dipoles of the electret layers 2 and 3 orient themselves in accordance with an applied electric field. The degree of dipole orientation is a function of the temperature to which the layers 2 and 3 are heated, the applied field strength and length of time the field is applied. For example, substantial poling begins in polyvinylidene fluoride when it is heated to a temperature greater than 90° C with an electric field of at least 4,000 volts per millimeter of thickness applied for approximately 15 minutes. Increasing the temperature and/or the applied electric field will progressively increase the degree of poling achieved up to a maximum of saturation.

Once the electret layers 2 and 3 are poled and then cooled below their poling temperature, the applied field may be removed and the dipoles of the layers 2 and 3 remain as oriented by the applied field. Care should be taken though to insure that the layers 2 and 3 are not heated above their poling temperature for extended periods in order that their dipoles are not permitted to return to a random orientation. After poling is completed, the layers 2 and 3 will thereafter produce opposite electrostatic charges on their planar surfaces when varied from an ambient temperature because of their pyroelectric properties. In addition, axial stress on the layers 2 and 3 will also produce electrostatic charges of opposite polarity on the surfaces of the layers 2 and 3 due to the piezoelectric properties of the layers 2 and 3.

It is preferable that the conductive layers 7 and 8 be equal in size to one another as well as the electret layers 2 and 3, and that the layers 2 and 3 have equal magnitudes of poling so that when the layers 2 and 3 are heated or stressed, equal levels of electrostatic charges will appear on the conductive layers 7 and 8. However, such conditions are not essential to the present invention because the layers 2 and 3 or 7 and 8 may differ in size, but equal charges may still be accumulated on the conductive layers 7 and 8 by using layers 2 and 3 which have been poled to a different degree.

Figure 2:
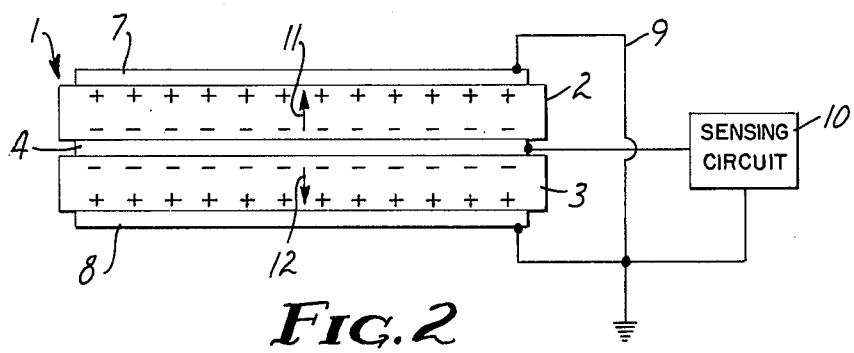
FIG. 2 is a sensor of FIG. 1 with electrostatic charges indicated thereon as are produced when the sensor is temperature varied.

To more fully describe the present invention, the operation of the sensor 1 will now be described. Upon varying the temperature of the sensor 1 in a uniform fashion so that the electret layers 2 and 3 are equally temperature varied, a uniform distribution of pyroelectrically derived electrostatic charges of opposite polarities will accumulate on the surfaces of the layers 2 and 3, as indicated in FIG. 2, in a direct proportion to the magnitude of poling of the layers 2 and 3 and their surface area. Because of the difference in the direction of poling of the layers 2 and 3, only electrostatic charges of one polarity appear on the outer surface of each of the layers 2 and 3 and only electrostatic charges of the opposite polarity appear on the inner surfaces of the layers 2 and 3. Thus, a perceptible voltage potential exists between the outer and inner surfaces of the layers 2 and 3. Because the layers 2 and 3 are substantially nonconductive, the electrically connected outer conductive layers 7 and 8 and the inner conductive layer 4 serve as means for conducting the charges from the surfaces of the layers 2 and 3 to the sensing circuit 10.

Thus, the sensor 1 serves to provide an electrical sensing signal when subjected to a temperature variation. Because of this characteristic, the sensor 1 has a wide variety of applications. However, many of the possible applications may result in intentional or unintentional bending of the sensor 1. But without piezoelectric compensation, the sensor 1 would not be entirely desirable to use in bending applications because the piezoelectric properties of the layers 2 and 3 produce spurious electrostatic charges when the layers 2 and 3 are subjected to a bending moment, and such charges may result in inaccurate sensing unless the sensor 1 provides compensation for such spurious charges. The construction of the sensor 1 is adapted to provide inherent piezoelectric compensation for bending to insure precise and accurate operation.

Figure 3:
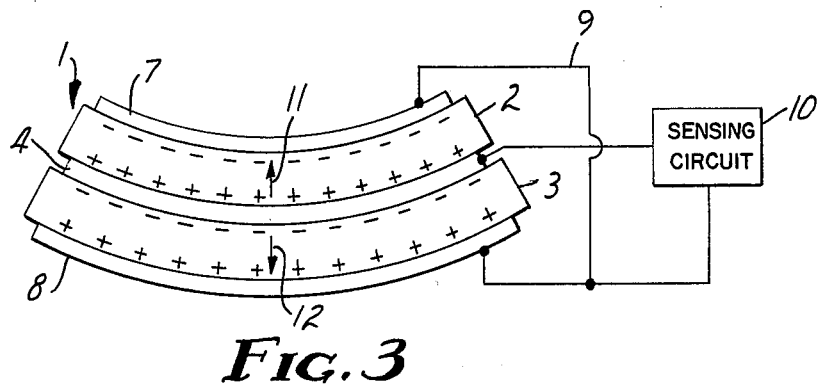
FIG. 3 is the sensor of FIG. 1 with electrostatic charges indicated thereon as are produced by bending of the sensor.

When the sensor 1 is subjected to stress as a result of bending, electrostatic charges form on the surfaces of the layers 2 and 3 with a magnitude directly proportional to the amount of tensile or compressive stress of the layers 2 and 3. The polarity of the electrostatic charges is dependent upon the direction of poling of the layers 2 and 3, and whether the stress is tensile or compressive. Taking these two factors into consideration, the sensor 1 is adapted so that bending of the sensor 1 will produce electrostatic charges that cancel one another whereas temperature variation of the layers 2 and 3 results in a perceptible sensing voltage. Such charge cancellation is achieved by making the stiffness of the inner conductive layer 4 greater than the stiffness of the layers 2 and 3 combined with their respective conductive coatings 7 and 8. Accordingly, when the sensor 1 is bent, the conductive layer 4 serves as a point of zero compression or tension and, as indicated in the exaggerated view of FIG. 3, the layer 3 is extended while the layer 2 is compressed. However, it should be understood that bending of the sensor 1 in the direction opposite to that shown will produce compression of the layer 3 and extension of the layer 2.

Due to the extension of the layer 3 positive and negative charges are respectively produced on the outer and inner surfaces thereof, whereas compression of the layer 2 produces negative and positive charges on its outer and inner surfaces. Because of the conductive layer 4 connecting the oppositely charged inner surfaces of the layers 2 and 3 together and the conductor 9 interconnecting the conductive layers 7 and 8 that electrically contact the oppositely charged outer surfaces of the layers 2 and 3, the piezoelectric produced charges of the sensor 1 result in a substantially zero net charge across the sensing circuit 10.

In addition to providing the advantage of compensating for piezoelectrically produced charges for a given temperature change, the sensor 1 also provides the advantage of increased sensitivity since the pyroelectrically produced sensing charge furnished by the two electret layer configuration is double the sensing charge that would be produced by a sensor employing a single layer of electret 2 or 3. Furthermore, the grounded conductive outer layers shield the sensor 1 from reacting to spurious electrostatic charges that could also produce inaccurate operation of the sensor 1.

Figure 4:
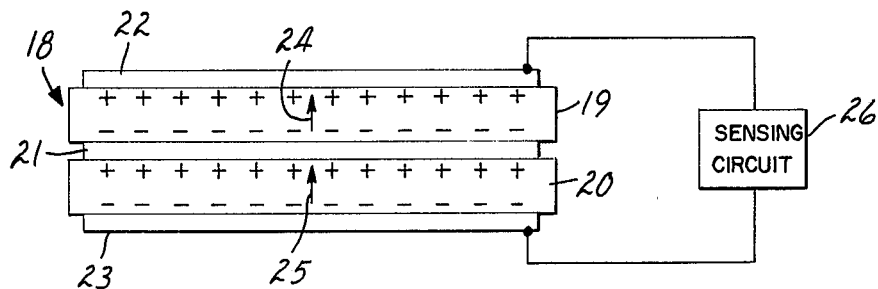
FIG. 4 is a schematic diagram of a second embodiment of the present invention that is utilized as a thermal sensing device, and with electrostatic charges indicated thereon as are produced when the sensor is temperature varied.

Referring now to FIG. 4, a second embodiment of the present invention is represented by a thermal sensor 18. Similar to the sensor 1, the sensor 18 has two electret layers 19 and 20 connected at their inner surfaces with a conductive layer 21 and coated respectively with conductive layers 22 and 23 on their outer surfaces. The sensor 18 differs from the sensor 1 by having both electret layers 19 and 20 poled in the same direction as indicated by the arrows 24 and 25, and a sensing circuit 26 is electrically connected across the outer conductive layers 22 and 23. In this arrangement of the present invention, uniform temperature variation of the layers 19 and 20 produces a sensing potential of electrostatic charges of opposite polarities on the surfaces of the electret layers 19 and 20, as shown in FIG. 4. However, in accordance with the previous description of the operation of the sensor 1, bending of the sensor 18 will produce only charges of one polarity on the outer surfaces of the electret layers 19 and 20 and charges of the opposite polarity on the inner surfaces thereof. The sensing circuit 26 is then presented to a substantially net zero charge.

Thus, as evidenced by the above described embodiments the present invention provides a simplistic means for achieving compensation of piezoelectric produced voltage potentials produced by bending in a thermal sensor. However, the present invention is not limited to such use because it may also be employed for compensating for pyroelectric produced voltage potentials in sensors that depend on the sensing of piezoelectric produced voltage potentials.

Figure 5:
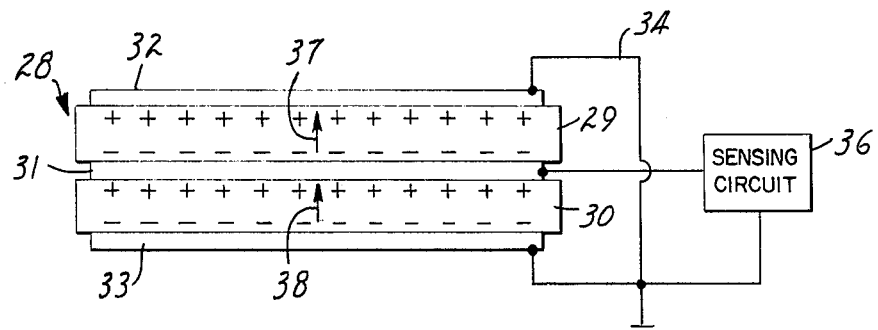
FIG. 5 is a third embodiment of the present invention that is utilized as a stress sensing device, and with electrostatic charges indicated thereon as are produced by uniformly temperature varying the sensor.

Referring now to FIG. 5, a sensor 28 is shown that is adapted to compensate for pyroelectric produced voltage potentials. The sensor 28 includes two electret layers 29 and 30 connected at their inner surfaces by a conductive layer 31 that is relatively stiff with respect to the electret layers 29 and 30. The outer surfaces of the layers 29 and 30 are respectively coated with conductive layers 32 and 33 and are electrically grounded by a conductor 34. Connected across the conductive layer 31 and the conductor 34 is a sensing circuit 36 for detecting a voltage potential difference between the inner conductive layer 31 and the outer conductive layers 32 and 33.

The arrangement of the components forming the sensor 28 is identical to that of the sensor 1, but the two sensors differ from one another in that the electret layers 29 and 30 of the sensor 28 are poled in the same direction, as indicated by the arrows 37 and 38, whereas the electret layers of the sensor 1 are both poled in opposite directions. Because the layers 29 and 30 are poled in the same direction, a uniform temperature change will produce a distribution of electrostatic charges on the surfaces of the layers 29 and 30, as shown in FIG. 5, which charges cancel one another and produce a zero net potential to the sensing circuit 36.

Figure 6:
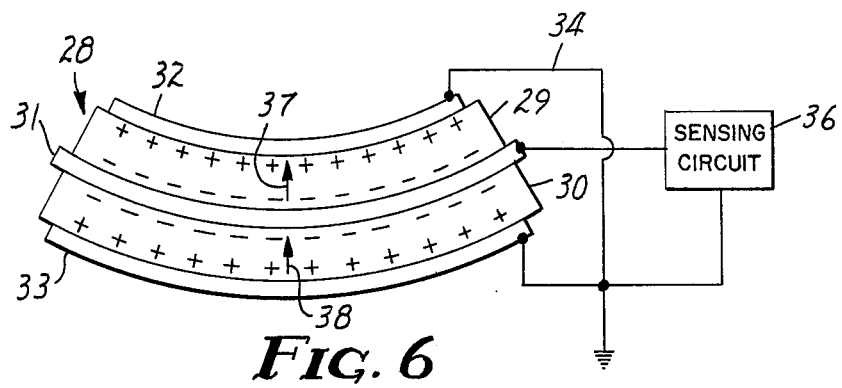
FIG. 6 is a view of the sensor of FIG. 5 with electrostatic charges indicated thereon as are produced by bending the sensor.

In contrast to the cancellation of electrostatic charges that are produced as a result of temperature variations of the sensor 28, bending of the sensor 28 produces a sensing potential across the circuit 36. The relatively stiff conductive layer 31 causes the sensor 28 to react to a bending force, as illuststrated in FIG. 6, by bending about the layer 31 such that the electret layer 29 is compressed and the layer 30 is extended. Accordingly, electrostatic charge accumulations result on the surfaces of the layers 29 and 30 to produce a sensing potential proportional to the degree of bending of the sensor 28.

Figure 7:
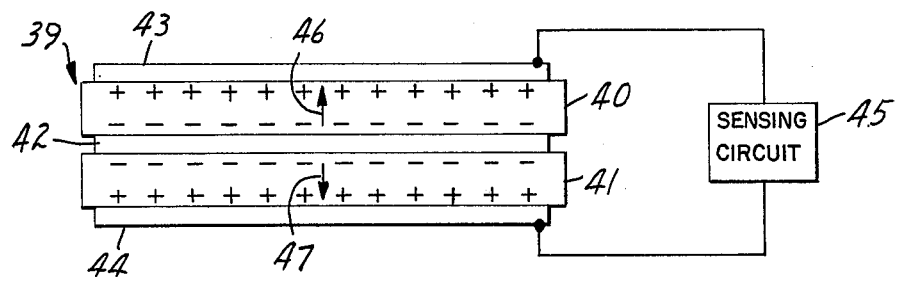
FIG. 7 is a schematic diagram of a fourth embodiment of the present invention and is utilized as a stress sensing device and with electrostatic charges indicated thereon as are produced by the uniform temperature variation of the sensor.

A fourth embodiment of the present invention is shown in FIG. 7 as a sensor 39 that includes electret layers 40 and 41, an inner conductive layer 42, and outer conductive layers 43 and 44. The sensor 39 differs from the sensor 28 of FIG. 5 by having a sensing circuit 45 connected across the outer conductive layers 43 and 44, and the electret layers are poled in opposite directions indicated by the arrows 46 and 47. Similar to the sensor 28, uniform temperature variation of the sensor 39 has no effect on the net voltage potential across the circuit 45, as indicated in FIG. 7, but bending of the sensor 39 results in a sensing potential in accordance with the previous description of the sensor 28.

What is claimed is:

1. An electret sensing device that is subjected to both temperature and stress variations and is employed for sensing one of said variations and ignoring the other of said variations, which device comprises:
   a first electret layer of poled material that has both piezoelectric and pyroelectric properties and develops electrostatic charges of opposite polarities on its surfaces in correspondence to variations in temperature and variations in stress of said first electret layer;
   a first conductive layer in surface-to-surface contact with one side of said first electret layer;
   a second electret layer of poled material that has both piezoelectric and pyroelectric properties and develops electrostatic charges of opposite polarities on the surfaces in correspondence to variations in temperature and variations in stress of said second electret layer, which second layer is positioned substantially parallel to said first electret layer;
   a second conductive layer in surface-to-surface contact with one side of said second electret layer;
   a third conductive layer interposed between the other sides of said first and second electret layers and in electrical surface-to-surface contact therewith; and
   electronic sensing circuitry connected to at least two of said conductive layers such that when the electret layers of said device are subjected to substantially uniform temperature variations and oppositely directed stress variations, said circuitry detects electrostatic charges thereon due to one of said variations in temperature and stress and ignores electrostatic charges thereon due to the other of said variations of temperature and stress.

2. In a sensing device as recited in claim 1 wherein said device is a thermal sensor, said electret layers are positioned with their poling directed in opposite directions, and said sensing circuitry is electrically connected between said third conductive layer and said first and second conductive layers whereby pyroelectrically produced electrical signals due to temperature variation are detected by said sensor and piezoelectrically produced signals due to bending are canceled.

3. In a sensing device as recited in claim 1 wherein said device is a thermal sensor, said electret layers are positioned with their poling directed in the same direction, and said sensing circuitry is electrically connected between said first and second conductive layers whereby pyroelectrically produced electrical signals are detected by said sensor and piezoelectrically produced signals due to bending are canceled.

4. In a sensing device as recited in claim 1 wherein said device is a stress sensor, said electret layers are positioned with their poling in the same direction and said sensing circuitry is electrically connected between said third conductive layer and said first and second conductive layers whereby piezoelectrically produced electrical signals are detected by said sensor and pyroelectrically produced signals are canceled.

5. In a sensing device as recited in claim 1 wherein said device is a stress sensor, said electret layers are positioned with their poling in opposite directions, and said sensing circuitry is electrically connected between said first conductive layer and said second conductive layer whereby piezoelectrically produced electrical signals are detected by said sensor and pyroelectrically produced signals are canceled.

6. In a sensing device as recited in claim 3 wherein said third conductive layer is less flexible than the other layers of said device in order that said third conductive layer serves as a plane of zero compression and tension when the sensing device is bent.

* * * * *